(12) United States Patent
Yamaguchi et al.

(10) Patent No.: US 9,254,522 B2
(45) Date of Patent: Feb. 9, 2016

(54) MOLD CLAMPING DEVICE

(75) Inventors: Kazuyuki Yamaguchi, Kariya (JP);
Kazuki Funahashi, Kariya (JP);
Nobuyuki Haguro, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 12 days.

(21) Appl. No.: 14/127,347

(22) PCT Filed: Jun. 21, 2012

(86) PCT No.: PCT/JP2012/065888
§ 371 (c)(1),
(2), (4) Date: Dec. 18, 2013

(87) PCT Pub. No.: WO2013/008603
PCT Pub. Date: Jan. 17, 2013

(65) Prior Publication Data
US 2014/0202652 A1    Jul. 24, 2014

(30) Foreign Application Priority Data

Jul. 12, 2011   (JP) ................................. 2011-154131

(51) Int. Cl.
*B22D 17/26*   (2006.01)
*B29C 45/66*   (2006.01)
*B29C 33/20*   (2006.01)

(52) U.S. Cl.
CPC ............ *B22D 17/263* (2013.01); *B29C 33/202* (2013.01); *B29C 45/66* (2013.01); *B29C 2045/664* (2013.01)

(58) Field of Classification Search
CPC .... B22D 17/26; B22D 17/263; B22D 17/266; B29C 45/66; B29C 2045/664

USPC .......................................... 164/303, 341, 342
See application file for complete search history.

(56) References Cited

U.S. PATENT DOCUMENTS

| 3,327,353 | A |   | 6/1967  | Eggenberger |           |
|-----------|---|---|---------|-------------|-----------|
| 3,353,221 | A | * | 11/1967 | Barnett al. | 425/451.9 |
| 3,579,742 | A | * | 5/1971  | Muttart     | 425/151   |

(Continued)

FOREIGN PATENT DOCUMENTS

| AT | 196571  | 3/1958  |
|----|---------|---------|
| DE | 2219247 | 10/1973 |

(Continued)

OTHER PUBLICATIONS

Japanese Office action having mail date of Aug. 19, 2014.

(Continued)

*Primary Examiner* — Kevin P Kerns
(74) *Attorney, Agent, or Firm* — Greenblum & Bernstein, P.L.C.

(57) ABSTRACT

The mold clamping device is provided with a first platen to which a stationary mold is attached. A movable mold unit is capable of approaching and moving away from the stationary mold. A second platen is linked to the first platen via a tie bar. When the movable mold unit and the stationary mold are closed, a wedge member is driven onto the movable mold unit to generate mold clamping force. The second platen has a pressure receiving surface. The pressure receiving surface receives, through the wedge member, mold opening force that is generated by filling, with a molding material, the stationary mold and the movable mold unit that are in the closed state.

7 Claims, 3 Drawing Sheets

(56) References Cited

U.S. PATENT DOCUMENTS

| | | | |
|---|---|---|---|
| 2005/0170038 A1* | 8/2005 | Koike et al. | 425/595 |
| 2006/0228438 A1* | 10/2006 | Koike et al. | 425/472 |
| 2007/0222097 A1 | 9/2007 | Nishimura et al. | |

FOREIGN PATENT DOCUMENTS

| | | |
|---|---|---|
| DE | 20108090 | 8/2001 |
| GB | 513756 | 10/1939 |
| JP | 39-23714 | 10/1964 |
| JP | 52-2412 | 1/1977 |
| JP | 63-149125 | 6/1988 |
| JP | 2-214635 | 8/1990 |
| JP | 11-129301 | 5/1999 |
| JP | 2000-334796 | 12/2000 |
| JP | 2004-195804 | 7/2004 |
| JP | 2006-218627 | 8/2006 |
| JP | 2007-253458 | 9/2007 |

OTHER PUBLICATIONS

International Preliminary Report on Patentability for PCT/JP2012/065888 (English-language Translation).

European Search Report in counterpart European Application No. 12810984.0, dated Aug. 11, 2015.

\* cited by examiner

MOLD CLAMPING DEVICE

TECHNICAL FIELD

The present invention relates to a mold clamping device that generates mold clamping force applied to a stationary mold and a movable mold, which are in a closed state.

BACKGROUND ART

Injection molding apparatuses have been known as apparatuses that inject molding material into a mold to fill the mold, thereby molding a desired article. An injection molding apparatus includes an injection device, which injects a molding material into a mold, and a mold clamping device that generates a strong mold clamping force applied to a stationary mold and a movable mold that are in a closed state. As mold clamping devices, a toggle type mold clamping device and a straight hydraulic type mold clamping device are known. To reduce the size of an injection molding apparatus, Patent Document 1 discloses a mold clamping device that is an alternative to toggle types and straight hydraulic types.

The mold clamping device of Patent Document 1 includes a pair of sandwiching members that generates mold clamping force by directly sandwiching a stationary mold and a movable mold that are in a closed state. The sandwiching members are actuated by a cylinder to sandwich the stationary mold and the movable mold.

PRIOR ART DOCUMENT

Patent Document 1: Japanese Laid-Open Patent Publication No. 2-214635

SUMMARY OF THE INVENTION

Since the mold clamping device of Patent Document 1 directly sandwich the closed stationary and movable molds using the sandwiching members, the device requires a large-scale actuating section and guiding section for actuating and guiding the large-sized sandwiching members. This limits the size reduction of the mold clamping device.

Accordingly, it is an objective of the present invention to provide a mold clamping device the size of which can be reduced while exerting sufficient mold clamping force.

To achieve the foregoing objective and in accordance with one aspect of the present invention, a mold clamping device is provided that includes a first platen to which a stationary mold is attached, a movable mold unit that is capable of approaching and moving away from the stationary mold, a second platen linked to the first platen via a tie bar, and a wedge member. When the movable mold unit and the stationary mold are closed, the wedge member is driven onto the movable mold unit to generate mold clamping force. The second platen has a pressure receiving surface. The pressure receiving surface receives, through the wedge member, mold opening force that is generated by filling, with a molding material, the stationary mold and the movable mold unit that are in the closed state.

According to the above configuration, the mold clamping device generates mold clamping force using the wedge member. Thus, compared to a conventional mold clamping device that generates mold clamping force of the same magnitude, the mold clamping device of the above configuration can be reduced in size. Also, since the mold opening force is received by the second platen via the wedge member, a sufficient mold clamping force is ensured.

The movable mold unit may include a movable mold and a movable mold holding portion. The movable mold and the stationary mold are closed to form a cavity, and the movable mold holding portion preferably holds the movable mold. The wedge member is preferably driven onto a back of the movable mold holding portion.

According to this configuration, the mold clamping device generates mold clamping force by driving the wedge member onto the back face of the movable mold holding portion. Therefore, when the movable mold is replaced, the position of the wedge member does not need to be adjusted. This simplifies the structure of the mold clamping device.

The wedge member is preferably incorporated in the second platen.

According to this configuration, the wedge member and the means for actuating the wedge member can be collectively arranged in the second platen. This simplifies the structure of the mold clamping device, and contributes to size reduction of the mold clamping device.

The wedge member may be one of a plurality of wedge members. In this case, the wedge members are preferably connected to an actuating mechanism that is capable of individually controlling the driving of the respective wedge members.

According to this configuration, the amount of actuation of each wedge member can be individually adjusted, so that a required mold clamping force can be adequately generated.

Alternatively, in a case in which the wedge member is one of a plurality of wedge members, a single actuating means may actuate the wedge members to switch the wedge members between a driven state and a non-driven state.

According to this configuration, since the multiple wedge members are operated by the single actuating means, the structure of the mold clamping device is simplified. This contributes to reduction in size and cost.

Effects of the Invention

The present invention provides a mold clamping device that can be reduced in size, while being capable of exerting sufficient mold clamping force.

DETAILED DESCRIPTION OF THE PREFERRED EMBODIMENTS

First Embodiment

A first embodiment of the present invention will now be described with reference to FIGS. 1(a) to 1(c).

A mold clamping device 10 of the present embodiment is provided in a die cast machine having an injection unit UT. The injection unit UT injects a molding material, which is a molten metal such as aluminum, into a cavity defined by a stationary mold 11 and a movable mold 12 to fill the cavity with the molding material.

Figure 1:
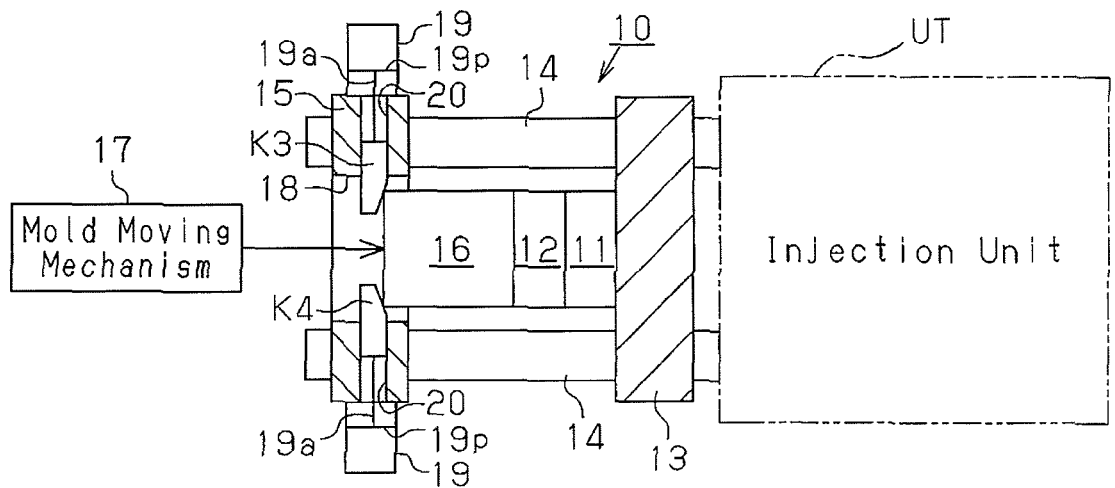
FIG. 1(a) is a plan view illustrating a mold clamping device according to a first embodiment of the present invention.
FIG. 1(b) is a side view illustrating the mold clamping device according to the first embodiment of the present invention.
FIG. 1(c) is a cross-sectional view of a second platen of the mold clamping device shown in FIGS. 1(a) and 1(b), incorporating wedge members.
Figure 1:
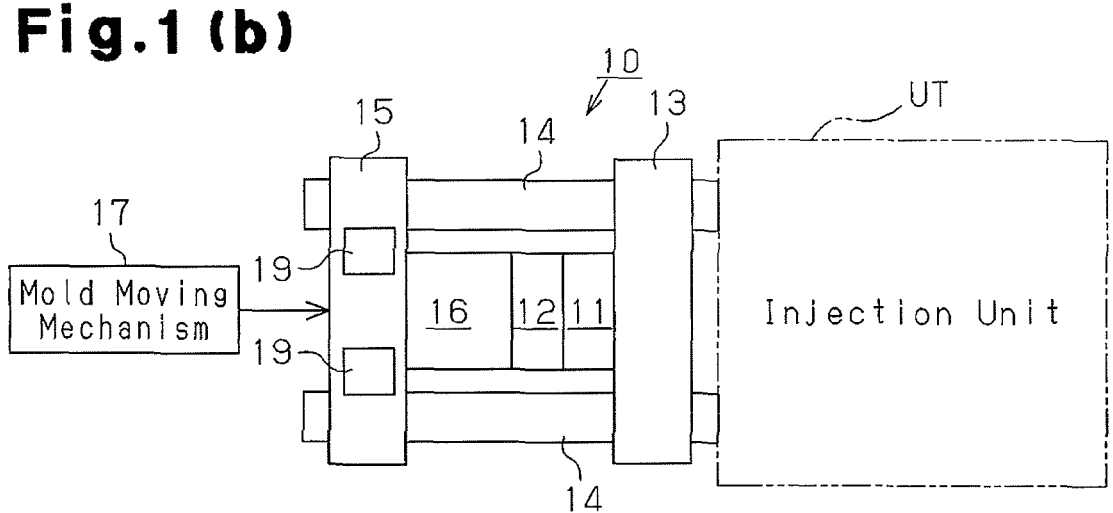
Figure 1:
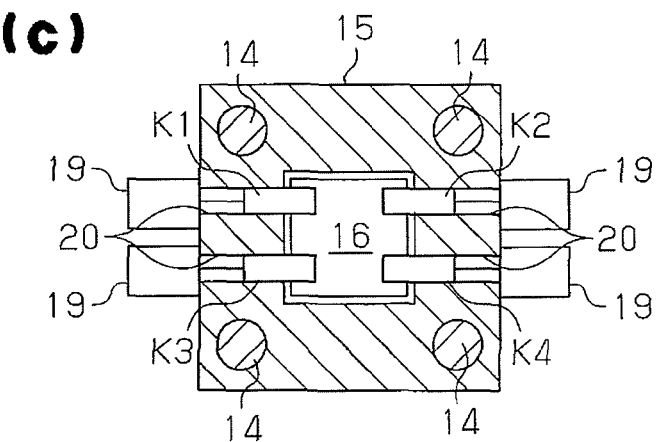

As shown in FIGS. 1(a) to 1(c), the mold clamping device 10 includes a first platen 13, to which the stationary mold 11 is attached, and a second platen 15, which is linked to a plurality of (four in the present embodiment) tie bars 14. The first platen 13 is fixed to a base of the die cast machine (not shown). The second platen 15 is fixed to the first platen 13 via the tie bars 14. The tie bars 14 are provided at the four corners of the first platen 13 and the second platen 15 and receive the mold clamping force generated by the mold clamping device 10. The mold clamping force acts on the stationary mold 11 and the movable mold 12 that are in a closed state, so that the molds 11, 12 are maintained in the closed state against the pressure of the molding material filling the cavity.

The movable mold 12 is held by a die plate 16, which functions as a movable mold holding portion. The movable mold 12 is configured to be moved to and away from the stationary mold 11 together with the die plate 16 by a mold moving mechanism 17, which is coupled to the die plate 16. In the present embodiment, the movable mold 12 and the die plate 16 form a movable mold unit. The molds 11, 12 are closed by causing the movable mold 12 to approach the stationary mold 11, and the molds 11, 12 are opened by moving the movable mold 12 away from the stationary mold 11. The mold moving mechanism 17 is formed by a servo motor, which is a servo controlled electric motor, a ball screw rotated by the servo motor, and a nut, which is threaded to the ball screw and coupled to the die plate 16. The nut is moved back and forth when the ball screw is rotated by the servo motor. In response to the back and forth movement of the nut, the mold moving mechanism 17 applies actuating force to the die plate 16 and the movable mold 12.

The second platen 15 is formed in to a square frame. That is, the second platen 15 has a through hole in a center that extends along the thickness. The through hole functions as a passage opening 18, through which the movable mold 12 and the die plate 16 pass when receiving the actuating force from the mold moving mechanism 17.

The second platen 15 incorporates a plurality of (four in the present embodiment) wedge members K1, K2, K3, K4, which are used for generating mold clamping force. The wedge member K1 to K4 are each coupled to a different actuating mechanism, specifically a piston rod 19a of an actuating cylinder 19. Each actuating cylinder 19 is actuated by an oil tank, a pump that draws hydraulic oil, and piping and a valve that supply hydraulic oil to and drain hydraulic oil from the actuating cylinder 19.

The second platen 15 has guide passages 20, which extend in directions perpendicular to the thickness of the second platen 15 and communicate with the passage opening 18. In the present embodiment, two of the guide passages 20 are located on each side of the second platen 15. On each side of the second platen 15, the corresponding guide passages 20 are arranged vertically at a predetermined distance. Each guide passage 20 receives one of the wedge members K1 to K4. Each wedge member K1 to K4 receives actuating force from one of the actuating cylinders 19 to be actuated while being slid and guided along the inner surface defining the corresponding guide passage 20. More specifically, hydraulic oil is supplied to the head-side chambers of the actuating cylinders 19 to move the pistons 19p forward so that the wedge members K1 to K4 project into the passage opening 18. In contrast, hydraulic oil is supplied to the rod-side chambers of the actuating cylinders 19 to move the pistons 19p backward so that the wedge members K1 to K4 are retracted from the passage opening 18. That is, the wedge members K1 to K4 are incorporated in the second platen 15 to be capable of projecting into and being retracted from the passage opening 18. The actuating cylinders 19 are each fixed to the side of the second platen 15 at a position corresponding to the associated guide passage 20.

As shown in FIGS. 1(a) and 1(c), the wedge members K1 to K4 are driven onto the back of the die plate 16 in a state where the movable mold 12 and the stationary mold 11 are closed. That is, the wedge members K1 to K4 apply mold clamping force to the stationary mold 11 and the movable mold 12 via the back of the die plate 16. The inner surfaces of the guide passages 20 function as pressure receiving surfaces. That is, a molding material is injected into the cavity of the stationary mold 11 and the movable mold 12 in a closed state, the injected molding material generates a force acting to open the molds 11, 12. The inner surfaces of the guide passages 20 receive the mold opening force.

Operation of the mold clamping device 10 of the present embodiment will now be described with reference to FIGS. 1(a) to 1(c) and FIG. 2.

Figure 2:
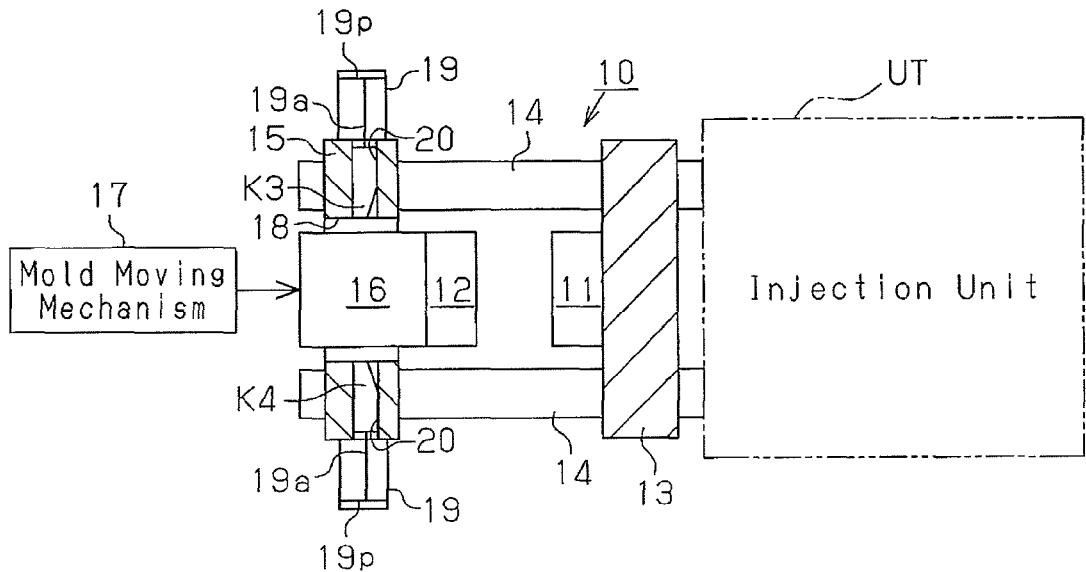
FIG. 2 is a plan view illustrating the mold clamping device according to the first embodiment in an open mold state.

In the mold open state illustrated in FIG. 2, a control command is sent to the mold moving mechanism 17 such that the movable mold 12 and the die plate 16 are moved toward the stationary mold 11. In the mold open state, the wedge members K1 to K4 are retracted to positions where the wedge members K1 to K4 do not interfere with the movable mold 12 or the die plate 16, which are being moved toward the stationary mold 11. When the movable mold 12 reaches a position at which the movable mold 12 and the stationary mold 11 are closed, the operation of the mold moving mechanism 17 is stopped.

Next, the pistons 19p of the actuating cylinders 19 are advanced to cause the wedge members K1 to K4, which are at the retracted positions, to protrude into the passage opening 18. Accordingly, the wedge members K1 to K4 are driven onto the back of the die plate 16 to generate mold clamping force. The mold clamping force is received by the inner surfaces of the guide passages 20 of the second platen 15 and by the tie bars 14, which are linked to the second platen 15.

Thereafter, the injection unit UT injects a metal material into the cavity formed by closing the stationary mold 11 and the movable mold 12. At this time, the movable mold 12 is subjected to mold opening force generated by the injection of the metal material. The mold opening force is received by the inner surfaces of the guide passages 20 of the second platen 15 via the wedge members K1 to K4 and by the tie bars 14.

Accordingly, the first embodiment achieves the following advantages.

(1) The mold clamping device 10 generates mold clamping force using the wedge members K1 to K4. Thus, compared to a conventional mold clamping device that generates mold clamping force of the same magnitude, the mold clamping device 10 can be reduced in size. Also, since the mold opening force generated by filling the cavity with the molding material is received by the second platen 15 via the wedge members K1 to K4, the mold clamping device 10 generates sufficient mold clamping force.

(2) The mold clamping device 10 generates mold clamping force by driving the wedge members K1 to K4 onto the back of the die plate 16. Therefore, when the movable mold 12 is replaced, the positions of the wedge members K1 to K4 do not need to be adjusted. This simplifies the structure of the mold clamping device 10.

(3) The wedge members K1 to K4 are arranged symmetrically and driven onto the four corners of the back of the die plate 16. This generates an even mold clamping force. That is, it is possible to apply a uniform mold clamping force to the stationary mold 11 and the movable mold 12.

(4) The second platen 15 is integrated with the first platen 13 via the tie bars 14. This allows the second platen 15 to receive mold clamping force and mold opening force. Also, the first platen 13, the tie bars 14, and the second platen 15 reliably maintain the mold clamping force. Further, compared to a configuration in which the second platen 15 is moved directly, the size of the mold moving mechanism 17 can be reduced, which moves the movable mold 12 toward or away from the stationary mold 11.

(5) The wedge members K1 to K4 are incorporated in the second platen 15, and the actuating cylinders 19 are fixed to the second platen 15. That is, means for generating mold clamping force are collectively arranged in the second platen 15. This simplifies the structure of the mold clamping device 10, and contributes to size reduction of the mold clamping device 10.

Second Embodiment

Figure 3:
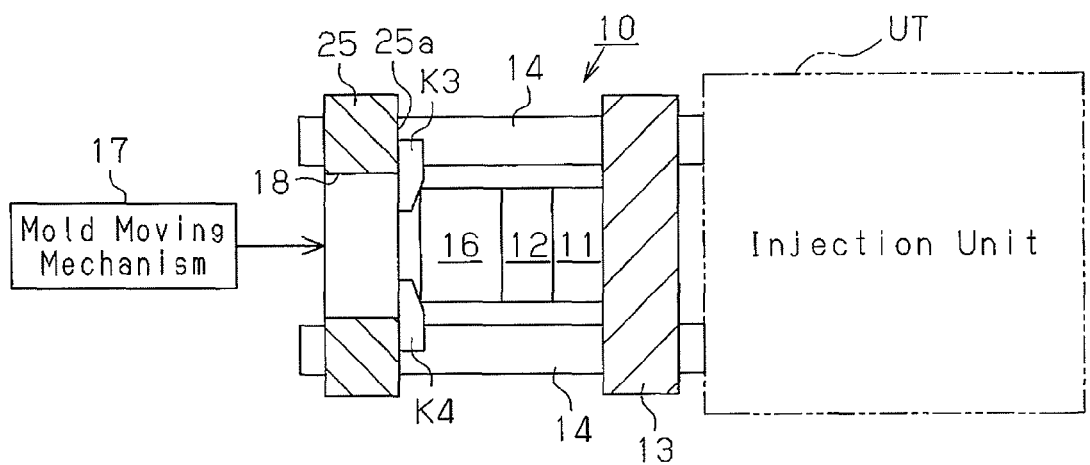
FIG. 3 is a plan view illustrating a mold clamping device according to a second embodiment of the present invention.

A second embodiment of the present invention will now be described with reference to FIG. 3. The same components in the embodiments below as those in the above described embodiment are given the same reference numerals and names, and redundant description thereof will be omitted or simplified.

A mold clamping device 10 according to the second embodiment includes a second platen 25, which is different from the second platen 15 of the mold clamping device 10 according to the first embodiment. The second platen 25 has a passage opening 18. The second platen 25 has a front face 25a, which is a surface facing the first platen 13. The front face 25a serves as a pressure receiving surface that receives mold clamping force and mold opening force. That is, in the second embodiment, the front face 25a of the second platen 25 is provided with wedge members K1 to K4. The wedge members K1 to K4 are actuated by an actuating mechanism (an actuating cylinder, which is not shown) along the front face 25a to be projected into and retracted from the passage opening 18.

Also, in the second embodiment, when the stationary mold 11 and the movable mold 12 are closed, the entire die plate 16 is located outside the passage opening 18, that is, between the first platen 13 and the second platen 25. Therefore, when generating mold clamping force, the wedge members K1 to K4 are driven onto the back of the die plate 16 between the front face 25a of the second platen 25 and the die plate 16, as illustrated in FIG. 3. The mold clamping force is received by the front face 25a of the second platen 25 and by the tie bars 14, which are linked to the second platen 25. The mold opening force, which is generated by injection of metal material, is received by the front face 25a of the second platen 25 via the wedge members K1 to K4 and by the tie bars 14.

The mold clamping device 10 of the second embodiment is configured on the premise that, when the wedge members K1 to K4 are driven onto the back of the die plate 16, the wedge members K1 to K4 are brought into a surface contact with the front face 25a of the second platen 25.

The second embodiment achieves the advantages (1) to (4) of the first embodiment.

Third Embodiment

Figure 4:
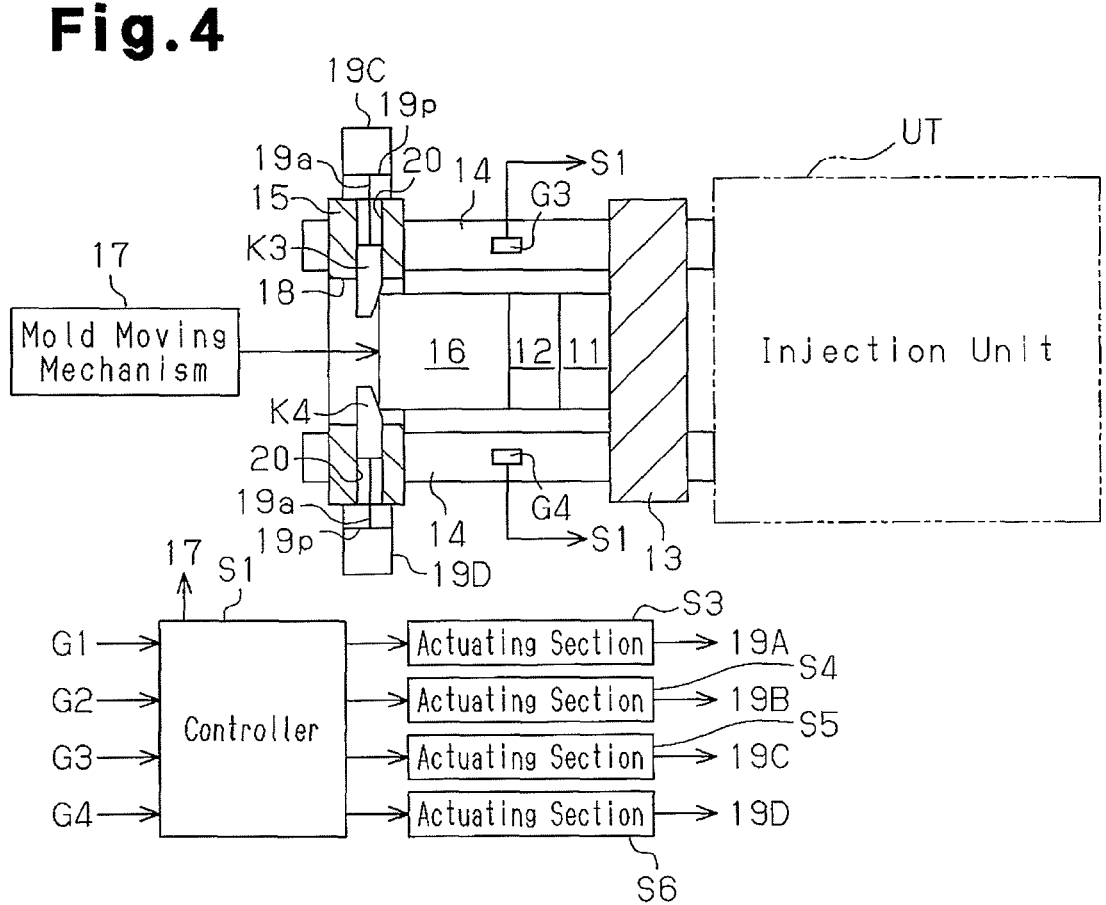
FIG. 4 is a plan view illustrating a mold clamping device according to a third embodiment of the present invention.

A third embodiment of the present invention will now be described with reference to FIG. 4.

In the third embodiment, the tie bars 14 each have a strain gauge G1, G2, G3, G4. The strain gauges G1 to G4 are connected to a controller S1. The controller S1 receives electric signals from the strain gauges G1 to G4 and detects the amount of strain, or the amount of deformation of each tie bar 14 based on the electric signals.

Also, in the third embodiment, the actuating cylinders 19, which are coupled to the wedge members K1 to K4, are connected to actuating sections S3, S4, S5, S6 for independently controlling the actuating cylinders 19, respectively. In FIG. 4, to distinguish the actuating cylinders 19 from each other, the actuating cylinders coupled to the wedge members K1, K2, K3, K4 are denoted by reference numerals 19A, 19B, 19C, 19D, respectively.

Each of the actuating sections S3 to S6 is formed by a servo motor, which is a servo controlled electric motor, a ball screw rotated by the servo motor, and a nut, which is threaded to the ball screw and coupled to the piston rod 19a of the corresponding actuating cylinder 19. This allows the position of the piston 19p of each actuating cylinder 19 (19A to 19D), that is, the amount of actuation of each of the wedge members K1 to K4 to be separately servo controlled.

When generating mold clamping force using the wedge members K1 to K4 of this configuration, the controller S1 first detects the amount of strain of each tie bar 14 based on electric signals from the strain gauges G1 to G4. In accordance with the detected strain amounts, the controller S1 adjusts, that is, increases or decreases the amount of actuation of the wedge members K1 to K4.

Therefore, in addition to the advantages (1) to (5) of the first embodiment, the third embodiment achieves the following advantages.

(6) The actuating cylinders 19A to 19D are separately controlled by the control sections S3 to S6. This allows the amounts of actuation of the wedge members K1 to K4 to be individually controlled. Accordingly, necessary mold clamping force is adequately generated.

(7) Particularly, even if the tie bars 14 are deformed (strained) over time, the actuation amount of the wedge members K1 to K4 can be adjusted to generate necessary mold clamping force. That is, the number of times of adjustment and replacement of the tie bars 14 is reduced, which contributes to improvement of the maintenance.

Fourth Embodiment

Figure 5A:
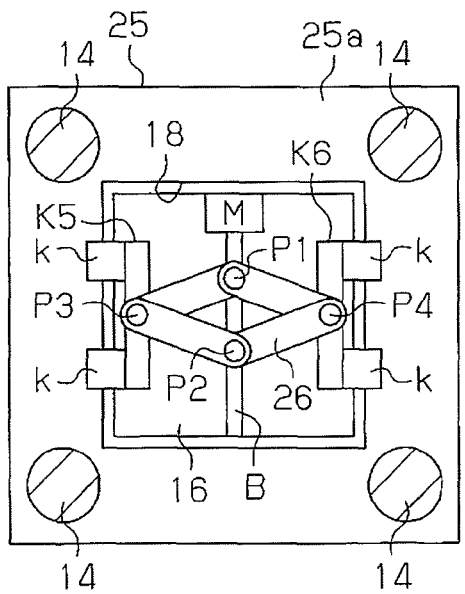
FIGS. 5(a) and 5(b) are front views illustrating a mold clamping device according to a fourth embodiment.
Figure 5B:
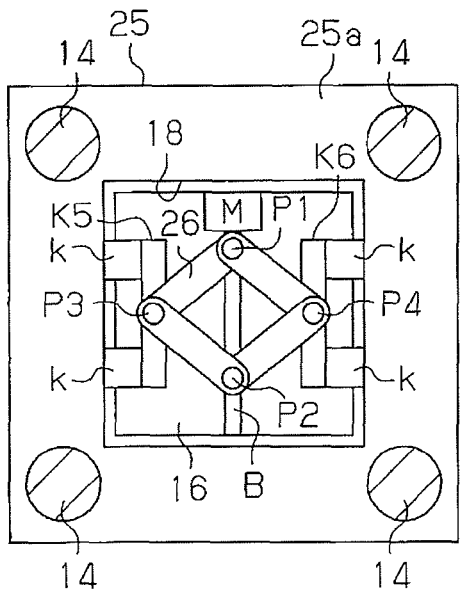

A fourth embodiment of the present invention will now be described with reference to FIGS. 5(a) and 5(b). FIGS. 5(a) and 5(b) illustrate a mold clamping device of the fourth embodiment, showing a front view of a front face 25a of a second platen 25, which faces a first platen 13.

The mold clamping device of the fourth embodiment includes wedge members K5, K6, which have a structure different from that of the wedge members K1 to K4 of the mold clamping devices 10 of the first to third embodiments. On the front face of the die plate 16, a ball screw B, which is rotated by a single servo motor M, a link mechanism 26 coupled to the ball screw B, and wedge members K5, K6 that are switched between a driven state and a non-driven state in response to the operation of the link mechanism 26 are provided. The ball screw B includes a left-right screw having a right-hand section and a left-hand section of the same lead. A nut (not shown) is threaded to each of the right-hand section and the left-hand section. The link mechanism 26 is a pantograph-like, that is, a rhombus-shaped contraction mechanism. One of a pair of opposed pivot points P1, P2 in the link mechanism 26 is coupled to the nut threaded to the right-hand section, and the other pivot points is coupled to the nut threaded to the left-hand section.

The wedge members K5, K6 each have two wedge sections k. Therefore, in a state in which the wedge members K5, K6 are driven, each of the wedge members K5, K6 has the two driven wedge sections k. The wedge members K5, K6 are coupled to different pivot points P3, P4, respectively, that are another pair of opposed pivot points in the link mechanism 26.

When the servo motor M rotates the ball screw B, the nuts, which are threaded to the ball screw B, are actuated, so that the link mechanism 26 either opens or closes. Accordingly, the wedge members K5, K6 either approach or move away from each other. Specifically, when the link mechanism 26 opens, that is, operates to extend the distance between the pivot point P3 and the pivot point P4 as shown in FIG. 5(a), the wedge members K5, K6 are separated from each other so that the wedge members K5, K6 are driven. On the other hand, when the link mechanism 26 closes, that is, operates to shorten the distance between the pivot point P3 and the pivot point P4 as shown in FIG. 5(b), the wedge members K5, K6 are brought closer to each other so that the wedge members K5, K6 are not driven. When the wedge members K5, K6 are not driven, the wedge members K5, K6 are retracted to the positions where they do not interfere with the second platen 25, so that the movable mold 12 and the die plate 16 can pass through the passage opening 18.

In this configuration, when mold clamping force is generated by using the wedge members K5, K6, the servo motor M is rotated by number of turns that corresponds to the amount of actuation of the wedge members K5, K6 required for switching these from the non-driven state to the driven state. Then, the rotation of the ball screw B actuates the nuts, which in turn opens the link mechanism 26. Accordingly, the wedge members K5, K6 are switched to the driven state to generate mold clamping force. At this time, the wedge sections k at multiple positions, specifically four positions, are driven by the single servo motor M.

The thus generated mold clamping force is received by the front face 25a of the second platen 25 and by the tie bars 14, which are linked to the second platen 25. The mold opening force, which is generated by injection of metal material, is received by the front face 25a of the second platen 25 via the wedge members K5, k6 and by the tie bars 14.

Therefore, in addition to the advantages (1) to (5) of the first embodiment, the fourth embodiment achieves the following advantage.

(8) The single servo motor M is used as an actuating means (actuating section) for actuating the wedge members K5, K6. This simplifies the structure of the mold clamping device, and contributes to reduction in size and cost. Also, a wedge actuating mechanism is electrified inexpensively.

The above described embodiments may be modified as follows.

In the first and second embodiments, the actuating mechanism for actuating the wedge members K1 to K4 may be an electrified mechanism including a servo motor and a ball screw. Alternatively, it is possible to employ a cylinder that is actuated by an electrified actuating mechanism formed by a servo motor and a ball screw, and to supply hydraulic fluid from the cylinder to the actuating cylinders 19.

In the first to third embodiments, the wedge members K1 to K4 may be driven onto the back of the die plate 16 simultaneously or in order.

In the third embodiment, each of the actuating sections S3 to S6 may be a hydraulic type that is formed by an oil tank, a pump that draws hydraulic oil, piping and a valve that supply hydraulic oil to and drain hydraulic oil from the actuating cylinder 19, and a pressure adjusting mechanism that independently adjusts the pressure. Alternatively, it is possible to employ a cylinder that is actuated by an electrified actuating mechanism formed by a servo motor and a ball screw, and to supply hydraulic fluid from the cylinder to the actuating cylinders 19.

In the fourth embodiment, the wedge members K5, K6, the link mechanism 26, the ball screw B, and the servo motor M may be provided on the back of the die plate 16 instead of on the front face of the die plate 16. In this case, the front face 25a of the second platen 25 functions as a pressure receiving surface as in the case of the fourth embodiment.

In the illustrated embodiments, the number of the wedge members may be reduced or increased. For example, only one wedge member may be provided as long as it generates a sufficient mold clamping force.

In the illustrated embodiments, the arrangement of the wedge members may be changed. For example, the wedge members may be arranged at upper and lower positions, instead of at left and right positions.

The present invention may be applied to a mold clamping device for an injection molding apparatus that produces plastic articles by injecting plastic material, instead of metal material, into the cavity in the molds.

DESCRIPTION OF THE REFERENCE NUMERALS

10: mold clamping device, 11: stationary mold, 12: movable mold, 13: first platen, 14: tie bars, 15 and 25: second platen, 16: die plate, 18: passage opening, 19 and 19A to 19D: actuating cylinder, 20: guide passage, M: servo motor, B: ball screw, K1 to K6: wedge members

The invention claimed is:

1. A mold clamping device comprising:
a first platen to which a stationary mold is attached;
a movable mold, wherein the movable mold and the stationary mold are closed to form a cavity;
a movable mold holding portion that is structured and arranged so as to be moved toward and away from the stationary mold together with the movable mold by a mold moving mechanism;
a second platen linked to the first platen via a tie bar; and
a wedge member that is structured and arranged to be driven onto a back of the movable mold holding portion to generate mold clamping force when the movable mold and the stationary mold are closed,
wherein the second platen has a pressure receiving surface structured and arranged to receive through the wedge member, a mold opening force generated by filling the stationary mold and the movable mold that are in the closed state with a molding material.

2. The mold clamping device according to claim 1, wherein the wedge member is incorporated in the second platen.

3. The mold clamping device according to claim 1, wherein the wedge member is one of a plurality of wedge members, and
wherein the wedge members are connected to an actuating mechanism that is capable of individually controlling the driving of the respective wedge members.

4. The mold clamping device according to claim 1, wherein the wedge member is one of a plurality of wedge members, and
wherein a single actuator actuates the wedge members to switch the wedge members between a driven state and a non-driven state.

5. The mold clamping device according to claim 1, wherein the movable mold is structured and arranged so as to be moved toward and away from the stationary mold in a longitudinal direction, and the wedge member is structured and arranged to be driven in a direction perpendicular to the longitudinal direction.

6. The mold clamping device according to claim 1, wherein the wedge member includes a tapered shape.

7. The mold clamping device according to claim 1, wherein the movable mold is structured and arranged to move along a movable mold path, and the wedge member is structured and arranged to be extendable into and retractable from the movable mold path.

* * * * *